United States Patent [19]

Chande

[11] Patent Number: 4,844,574
[45] Date of Patent: Jul. 4, 1989

[54] OPTICAL FIBER OUTPUT COUPLER FOR A POWER LASER

[75] Inventor: Tushar S. Chande, Pittsburgh, Pa.

[73] Assignee: General Electric Company, Schenectady, N.Y.

[21] Appl. No.: 214,975

[22] Filed: Jul. 5, 1988

[51] Int. Cl.$^4$ ............................. G02B 6/32; B23K 9/00
[52] U.S. Cl. ................................ 350/96.18; 350/96.10; 350/96.15; 350/96.20; 350/474; 219/121.6; 219/121.61
[58] Field of Search ............... 350/96.10, 96.15, 96.18, 350/96.20, 463, 469, 470, 471, 472, 473, 474, 480, 481, 483; 219/121.6, 121.61, 121.62, 121.75, 121.78

[56] References Cited

U.S. PATENT DOCUMENTS

| | | | |
|---|---|---|---|
| 3,419,321 | 12/1968 | Barber et al. | 219/121.61 X |
| 3,805,015 | 4/1974 | Herziger et al. | 219/121.61 X |
| 3,843,865 | 10/1974 | Nath | 219/121.6 X |
| 3,947,093 | 3/1976 | Goshima et al. | 219/121.6 X |
| 4,099,830 | 7/1978 | Whittle et al. | 219/121.6 X |
| 4,275,288 | 6/1981 | Makosch et al. | 219/121.61 X |
| 4,564,736 | 1/1986 | Jones et al. | 350/96.29 |
| 4,578,554 | 3/1986 | Coulter | 219/121.61 X |
| 4,676,586 | 6/1987 | Jones et al. | 350/96.20 |
| 4,681,396 | 7/1987 | Jones | 350/90.18 |
| 4,705,367 | 11/1987 | Eckbreth et al. | 350/572 |
| 4,707,073 | 11/1987 | Kocher | 350/96.23 |
| 4,722,337 | 2/1988 | Losch et al. | 128/303.1 |
| 4,753,521 | 6/1988 | Deserno | 350/96.18 |
| 4,794,615 | 12/1988 | Berger et al. | 372/69 |

OTHER PUBLICATIONS

Thorp, "Triplet Lens", IBM Tech. Discl. Bull., vol. 22, No. 1, 6/79, p. 242.

Primary Examiner—William L. Sikes
Assistant Examiner—Brian M. Healy
Attorney, Agent, or Firm—Henry I. Steckler; James C. Davis, Jr.; Paul R. Webb, II

[57] ABSTRACT

An optical fiber output coupler for application to a power laser beam transmitting optical fiber is disclosed. The output coupler includes lenses for expanding the fiber delivered beam in order to enable minimization of the diameter of a focussed spot provided by a focussing lens of the coupler.

5 Claims, 3 Drawing Sheets

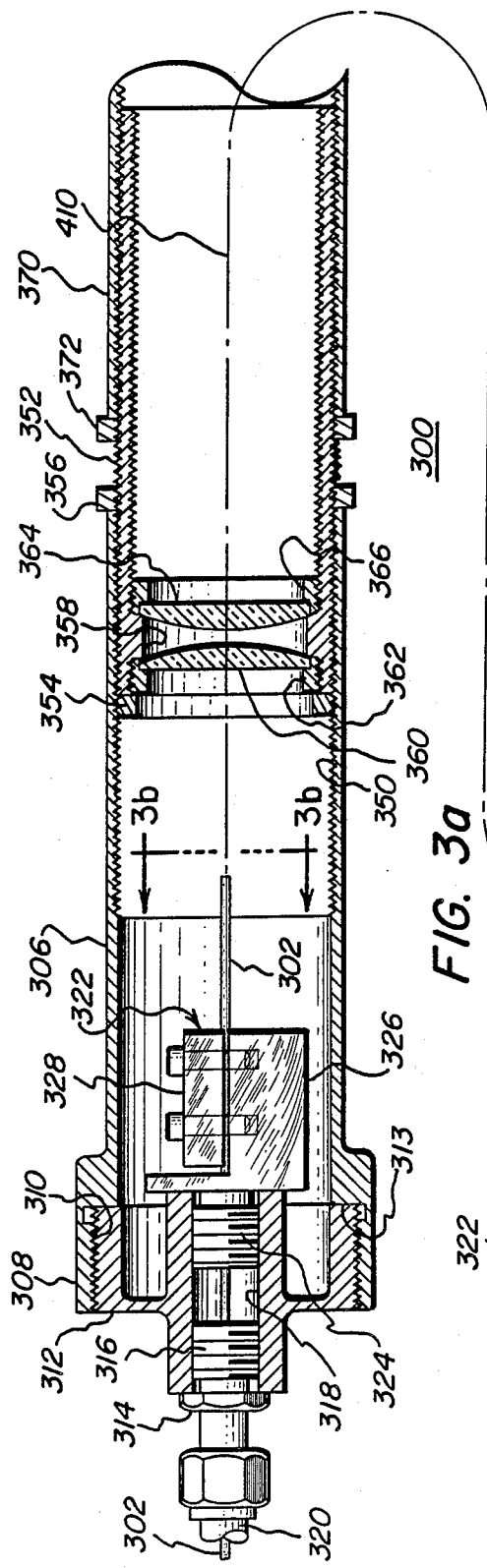
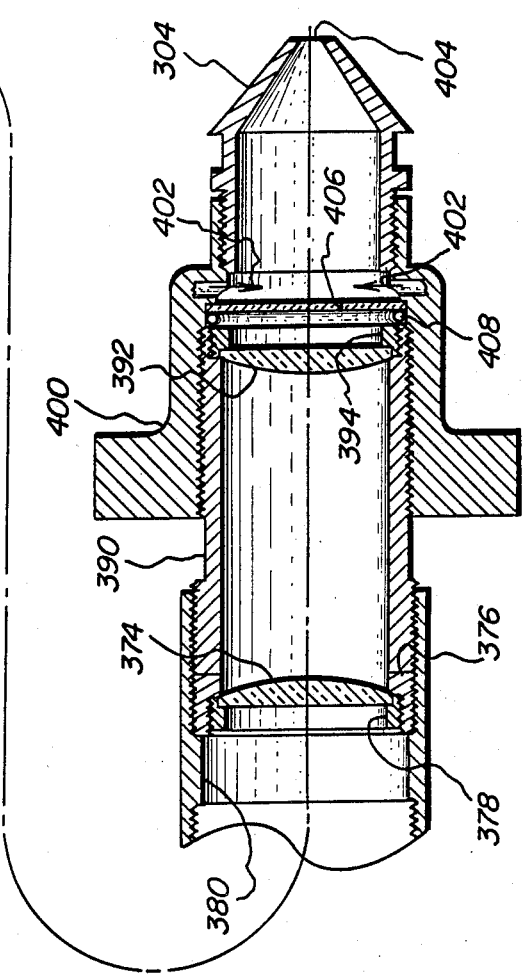
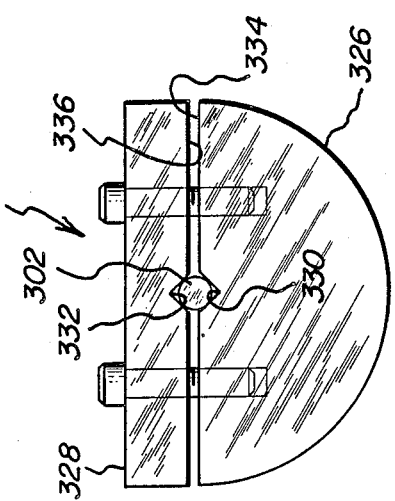
FIG. 3a
FIG. 3b

OPTICAL FIBER OUTPUT COUPLER FOR A POWER LASER

The present invention is directed in general to apparatus for the processing of materials with a power laser beam transmitted through an optical fiber and, more specifically, to an optical fiber output coupler for an optical fiber through which a materials processing power laser beam is transmitted.

BACKGROUND OF THE INVENTION

Laser materials processing as known in the art and used herein refers to performance of materials processes such as cutting, welding, drilling and soldering, using a continuous wave or pulsed laser beam. The average power of such a laser beam may range from as little as approximately one watt to hundreds of watts. It is also known in the art to transmit the laser beam from the laser to the vicinity of the workpiece by means of an optical fiber. The apparatus and method for injecting a power laser beam into an optical fiber for transmission therethrough are disclosed in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System" the disclosures of those patents being incorporated in their entirety herein by reference.

In order to perform materials processing with the laser beam emitted from an output end of the transmitting optical fiber, it is necessary to terminate the fiber output end in an output coupler. A typical prior art output coupler 100 is diagrammatically illustrated in FIG. 1. Coupler 100 comprises a fiber holder 102 to support the output end of an optical fiber 104 through which the power laser beam is being transmitted. The core of fiber 104 has a diameter $d_f$. The beam is emitted from the fiber output end, with an emitted cone angle $\theta_{EM}$, as an emitted beam portion 106. The output coupler further comprises a lens 108 for collimating as a collimated beam portion 110 the power laser beam emitted from the fiber output end. Collimating lens 108 has a focal length $f_1$ and is positioned the distance $f_1$ from the end of fiber 104. A second lens 112 is provided for focussing the collimated beam portion as a focussed beam portion 114. Focussing lens 112 has a focal length $f_2$. The focussed portion is focussed as a spot 116 onto a workpiece 118 on which a desired materials process is to occur. The coupler is assumed to be positioned relative to the workpiece to provide the distance $f_2$ between lens 112 and spot 116. In materials processing, irrespective of whether the laser beam is directly delivered from the laser to the vicinity of the workpiece by optical hardware (lenses, mirrors, etc.) or through an optical fiber, it is generally desirable to maximize the beam power density at the focussed spot on the workpiece. The power density achieved on the workpiece, such as at spot 116 in FIG. 1, is determined by dividing the amount of power contained in the delivered beam by the area of the focussed spot. Power density maximization is desirable since most laser materials processes, e.g. welding, will not occur below a minimum required power density and such processes will proceed with increased speed in proportion to the amount by which the focussed spot power density exceeds the minimum required power density.

One drawback to transmission of a power laser beam through an optical fiber is the adverse effect of the transmission on beam power and quality. The fiber transmitted laser beam experiences power losses during transmission through the fiber. To the extent total beam power is reduced, the focussed spot power density at the workpiece is correspondingly reduced. The adverse effect of optical fiber beam transmission on beam quality is described in connection with FIG. 2. FIG. 2 diagrammatically illustrates the injection of a collimated laser beam 150, generated by a laser 152, into the same optical fiber 104 illustrated in FIG. 1 for transmission therethrough. The collimated laser beam is focussed by a focussing lens 154, as a focussed portion 156, onto an input end of fiber 104 as a focussed spot having a diameter "$S_F$". Focussed portion 156 is characterized by an entry cone angle $\theta_{ENT}$. The focal length of lens 154 is $f_{154}$. In accordance with the criteria for successful power laser beam injection into an optical fiber as taught in the above incorporated patents, the focussed spot diameter $S_F$ must be less than the diameter $d_f$ of fiber 104. The beam quality of the laser beam as generated by laser 152 is $BQ_L$ and can be expressed as:

$$BQ_L = S_F \times \theta_{ENT} \qquad (1)$$

where the distance between lens 154 and the input end of the fiber is $f_{154}$. At the output end of fiber 104, the transmitted beam is emitted with the emitted cone angle of $\theta_{EM}$. The emitted beam fully occupies the diameter $d_f$ of the fiber core, so that the beam quality $BQ_F$ of the laser beam emitted at the fiber output end can be expressed as:

$$BQ_F = d_f \times \theta_{EM} \qquad (2)$$

The inventor has observed that $\theta_{EM}$ is usually greater than $\theta_{ENT}$. As a result, upon comparing equations (1) and (2), it is clear that an unavoidable degradation of beam quality will result both from the difference between the focussed spot size $S_F$ and the fiber diameter $d_f$ as well as from the cone angle difference.

The adverse effect of fiber transmission on beam quality has a direct effect on the power density achievable at the spot focussed on the workpiece. This is because the size of the spot that can be focussed on the workpiece is dependent on the beam quality of the beam being focussed. Referring again to FIG. 1 which illustrates prior art output coupler 100, lens 108 collimates the fiber emitted beam to a diameter $D_1$. Recalling that workpiece 118 is positioned such that spot 116 is spaced from focussing lens 112 by the distance $f_2$, then the diameter of spot 116, represneted by $d_s$, is given by:

$$d_s = BQ_F \times \frac{f_2}{D_1} \qquad (3)$$

where $BQ_F$ is the beam quality of the laser beam as emitted from the optical fiber. Thus, the focussed spot size depends directly on the beam quality so that to the extent the beam quality is degraded by fiber transmission, the value of $BQ_F$ increases, the focussed spot size increases and the achievable focussed spot power density decreases. It is noted that this adverse effect of beam quality degradation is amplified by the variation of focussed spot power density as the inverse of $d^2_s$.

The limitations inherent in the configuration of the prior art output coupler, for maximizing focussed spot power density, are described next. As seen in equation (3) above, the ability to adjust the design of the prior art output coupler to minimize the focussed spot diameter, and thereby maximize focussed spot power density, is limited to decreasing the focussing lens focal length and/or increasing the beam diameter ($D_1$). With respect to reducing the focussing lens focal length, there are practical processing considerations regarding a need to maintain a safe distance between the output coupler and the workpiece. If the coupler is too close, products given off by the process, e.g. weld spatter, may impinge on the coupler and cause damage thereto. Also, as known in the art, there are theoretical and practical manufacturing limitations on lenses which, for a given lens clear aperture, set the minimum possible focal length. For example, the approximate minimum ratio of focal length to clear aperture is "1" for an aspheric lens and "2" for a plano-convex lens. With respect to effecting an increase in beam diameter by adjusting the prior art coupler, two restrictions apply. First, such an increase in beam diameter would be accomplished by selecting collimating lens 108 with a longer focal length of intercept the fiber emitted beam at a larger diameter. However, interception of the larger diameter beam will likely also require a larger clear aperture for the collimating lens. Depending on the magnitude of $\theta_{EM}$, the required increase in lens clear aperture may outpace the required increase in lens focal length such that the above noted limitations on lens manufacture render fabrication of a suitable collimating lens impossible. Second, to the extent the clear aperture of the collimating lens is less than the diameter of the expanding beam, a portion of the total beam power will be lost and a corresponding reduction in achievable focussed spot power density experienced.

The above described possible adjustments to the prior art output coupler lenses can, in any event, achieve a focussed spot diameter that is no less than the diameter of the fiber from which the beam is emitted. Referring to FIG. 1, the emitted cone angle $\theta_{EM}$ can be expressed as:

$$\theta_{EM} = \frac{D_1}{f_1} \quad (4)$$

and this result can be substituted into equation (2) to provide:

$$BQ_f = d_f \times \frac{D_1}{f_1} \quad (5)$$

for the beam quality of the fiber emitted beam. The beam quality $BQ_{S1}$ of the beam focussed by lens 112 can be derived in analogous fashion and expressed as:

$$BQ_{S1} = d_s \times \frac{D_1}{f_2} . \quad (6)$$

Since the beam qualities $BQ_F$ and $BQ_{S1}$ must be identical, the right hands sides of equations (5) and (6) can be set equal to one another and then solved for spot diameter $d_s$ to provide:

$$d_s = d_f \times \frac{f_2}{f_1} . \quad (7)$$

It is therefore desirable to minimize the ratio $f_2/f_1$ in order to minimize spot diameter $d_s$. However, the instant inventor observes that since lenses 108 and 112 are respectively characterized by the lens manufacturing ratios $f_1/D_1$ and $f_2/D_1$, the ratio $f_2/f_1$ cannot be reduced below "1". As a result, the focussed spot diameter $d_s$ can in no event be reduced below $d_f$.

It is therefore a principal object of the present invention to provide an output coupler, for use with a power laser beam transmitting optical fiber, that compensates for the above described adverse effects of fiber transmission in order to improve the focussed spot power density achievable with the fiber transmitted beam.

SUMMARY OF THE INVENTION

In accordance with the present invention, there is provided an output coupler for a power laser beam transmitting optical fiber. The output coupler comprises first lens means for collimating as a first collimated beam portion the power laser beam emitted from an output end of the fiber and second lens means for expanding the first collimated beam portion into a second collimated beam portion having a larger diameter than the first collimated beam portion. The coupler also includes third lens means for focussing, onto a surface, the second collimated beam portion as a focussed spot having a predetermined diameter. Means are provided for mounting the first, second and third lens means and the fiber output end in alignment so that the power laser beam emitted from the fiber output end is collimated by the first lens means, expanded by the second lens means and focussed to the focussed spot by the third lens means.

In a preferred embodiment of the present invention, the output coupler is provided with the first lens means comprising a first plano-convex lens having a focal length $f_1$ and being mounted a distance $f_1$ from the fiber output end. The second lens means comprises a second and a third plano-convex lens. The second plano-convex lens is mounted to intercept the first collimated beam portion and provide an expanding beam portion beyond a focal point of the second plano-convex lens. The third plano-convex lens is mounted to intercept the expanding beam portion and provide the second collimated beam portion. The second and third plano-convex lenses have respective focal lengths $f_3$ and $f_4$ are are spaced from one another by a distance that is the sum of $f_3$ and $f_4$. Further in accordance with the preferred embodiment, the third lens means comprises a fourth plano-convex lens having a focal length $f_2$. The coupler would be positioned relative to the surface onto which the spot is being focussed to provide a distance $f_2$ between the fourth plano-convex lens and the focussed spot. With the diameter of the focussed spot designated $d_{si}$ and a core portion of the beam transmitting optical fiber having a diameter $d_f$, the focussed spot diameter is:

$$d_{si} = d_f \times \frac{f_2}{f_1} \times \frac{1}{f_4/f_3} .$$

BRIEF DESCRIPTION OF THE DRAWINGS

While the specification concludes with claims defining the features of the invention that are regarded as novel, it is believed that the invention together with further objects thereof, will be better understood from a consideration of the following description in conjunction with the drawing figures, in which:

FIGS. 3a and 3b illustrate an optical fiber output coupler constructed in accordance with a preferred embodiment of the present invention.

DESCRIPTION OF THE INVENTION

Figure 1:
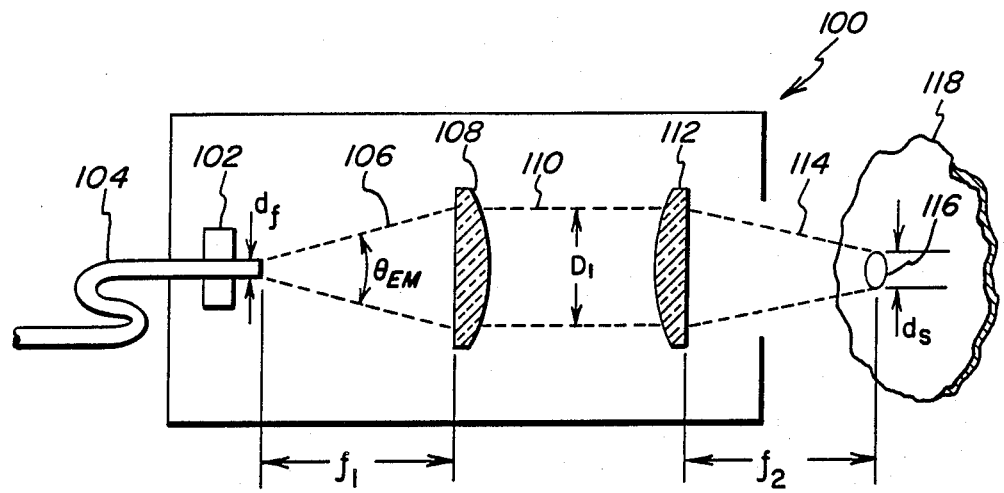
FIG. 1 diagrammatically illustrates a prior art output coupler.
Figure 2:
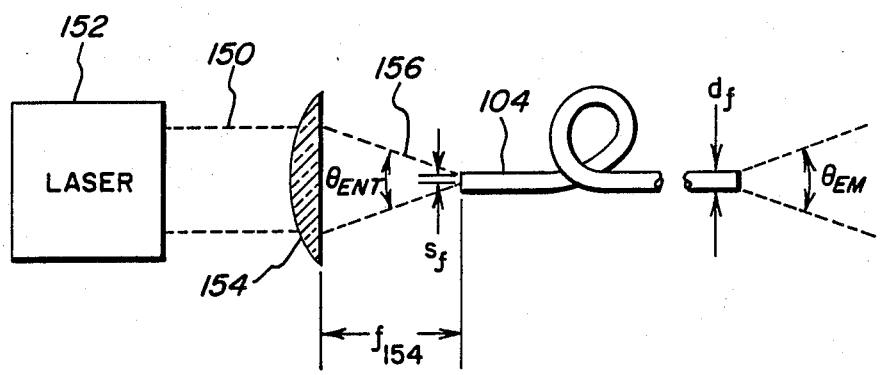
FIG. 2 diagrammatically illustrates injection of a laser beam into an optical fiber for transmission therethrough.

Referring now to the drawings, FIG. 3a illustrates an optical fiber output coupler 300 constructed in accordance with a preferred embodiment of the present invention. Coupler 300, which has an overall cylindrical shape, serves to collimate, expand and focus the laser beam transmitted through an optical fiber 302 to provide a focussed spot, on a workpiece positioned beyond a nozzle portion 304, having a power density greater than would be provided by the above described prior art output coupler. Coupler 300 comprises a barrel portion 306 which includes an end flange portion 308. Flange portion 308 includes an internally threaded portion 310 for receiving in threaded engagement an externally threaded fiber mounting bracket 312 which supports fiber 302. End flange portion 308 includes a shoulder portion 313 which serves as a stop against which mounting bracket 312 is screwed during assembly of coupler 300. Fiber 302 is introduced through a connector 314 that includes a threaded male portion 316 which matingly screws into an interior threaded bore 318 of the fiber mounting bracket. The connector serves to rigidly grasp a protective polyethylene tube 320 which contains the optical fiber. The practice of using such tubing is preferred by the instant inventor but is not essential to the practice of the present invention. The tubing is terminated within the body of connector 314 so that only the fiber emanates therefrom. Connector 314 may be provided as a tube fitting such as a model FH4BZ thermocouple connector manufactured by the Instrumentation Connectors Division of the Parker-Hannifin Corporation of Huntsville, Ala. Comparable connectors are also available as Swagelok tube fittings manufactured by the Crawford Fitting Company of Solon, Ohio.

Fiber 302 emanating from connector 314 is next supported in a split fiber holder 322. FIG. 3b illustrates an end view of holder 322 as viewed along the section line 3b-3b shown in FIG. 3a. Holder 322 includes a neck portion 324 threaded for screw engagement with interior bore 318 of mounting bracket 312. The neck portion also includes a hollow bore of sufficient diameter to allow the free passage therethrough of fiber 302. Neck portion 324 is contiguous with a base portion 326 which includes four threaded holes three of which are visible in FIGS. 3a and 3b. A cap 328 includes four holes which register with the holes in the base portion when the cap is mounted in place. The base portion and cap respectively include axial grooves 330 and 332 for receiving fiber 302. The respective grooves have a depth selected such that with fiber 302 in place, opposing faces 334 and 336 of the base portion and cap, respectively, do not make contact. Bolts are passed through the holes in the cap and screw tightened into the threaded holes of the base portion to compress fiber 302 within grooves 330 and 332 between the base portion and cap and thereby rigidly support the fiber against movement. It is noted that through loosening and retightening of the bolts, axial adjustment of the end of the fiber held by the fiber holder is possible. Fiber 302 is preferably axially positioned within its holder such that the free end of the fiber extends beyond the holder by a distance of approximately one inch. Fiber holder 322 is preferably fabricated of fused quartz in order to be transparent to laser energy and thereby avoid heating or damage that would otherwise be caused by inadvertent impingement thereon of such laser energy. If the laser energy is sufficiently low or the inadvertent laser impingement is not otherwise a concern, the fiber holder can be fabricated of other materials, e.g. plexiglass.

Referring again to FIG. 3a, barrel portion 306 further includes an internal threaded portion 350 for receiving in threaded engagement an externally threaded barrel portion 352. An externally threaded locking ring 354 and an internally threaded locking ring 356 are provided to lock the installed position of barrel portion 352 within barrel portion 306 against movement. Barrel portion 352 is generally internally threaded except for a lens mounting shoulder 358 located proximate one end thereof. A plano-convex lens 360 for collimating the laser beam emitted from the end of fiber 302 is mounted against the side of shoulder 358 nearest the end of fiber 302. Lens 360 is held in place against shoulder 358 by a retaining ring 362 that is externally threaded for engagement with the interior thread of barrel portion 352. A second plano-convex lens 364 is mounted against the other side of shoulder 358 for expanding the collimated beam provided by lens 360. Lens 364 is held in place against shoulder 358 by an externally threaded retaining ring 366 that engages the interior thread of barrel portion 352.

Coupler 300 further includes a barrel portion 370 which is generally internally threaded to enable screw engagement with the external threading of barrel portion 352. When installed, an internally threaded locking ring 372 secures barrel portion 370 against movement relative to barrel portion 352. A plano-convex lens 374, for collimating the expanding laser beam provided by lens 364, is mounted in a threaded mounting ring 376 and retained in the mounting ring by a retaining ring 378. When installed, mounting ring 376, with lens 374 mounted thereon, is screwed against an internal shoulder 380 of barrel portion 370. Coupler 300 additionally includes a barrel portion 390 which is externally threaded to enable engagement with the internal threading at the end of barrel portion 370 proximate which lens 374 is mounted. Barrel portion 390 is preferably screwed against lens mounting ring 376 and thereby prevents movement of the ring. A plano-convex focussing lens 392 is mounted at the end of barrel portion 390 remote from lens 374 and is held in place by an externally threaded retaining ring 394 which engages an internally threaded portion of barrel portion 390 at the end thereof.

Though not essential to the practice of the present invention, coupler 300 is preferably fitted with a gas manifold 400 for delivering a cover gas to nozzle portion 304 during materials processing such as welding. The delivery of the gas is diagrammatically shown by arrows 402. The construction of gas manifolds such as manifold 400 is well known in the art and the details of such construction are therefore not included in FIG. 3a. Nozzle 304 is illustrated as screwing into the free end of the gas manifold and is configured to deliver the cover gas through an opening 404 at the end thereof. Opening 404 is sufficiently large to enable a focussed portion of the laser beam, provided by focussing lens 392, to pass without obstruction therethrough. As an additional optional feature of the present invention, coupler 300 is fitted with a glass slide 406 which serves to protect lens 392 against any backspattering that may occur during materials processing. An O-ring 408 is interposed between slide 406 and the end of barrel portion 390 to provide support for the slide with the manifold in place. The slide is thus held in place against the O-ring by the gas manifold.

Coupler 300 is fabricated such that, with the lenses installed and the fiber mounting bracket in place, a predetermined desired alignment is achieved. When fully assembled, lenses 360, 364, 374 and 392 and the portion of fiber 302 extending from fiber holder 322 inclusive of the fiber end are all positioned to be coaxial about a longitudinal axis 410 of output coupler 300. This alignment about axis 410 is achieved through precise construction of coupler 300 and the rigid support of the lenses and fiber therein. The relative positions of lens 360 relative to fiber 302 and lens 374 relative to lens 364, along axis 410, are adjustable during assembly of coupler 300 due to the screw engagements of the various barrel portions. As indicated above, the position of the free end of fiber 302 is adjustable within holder 322 during initial installation. The barrel portions, fiber mounting bracket, gas manifold, nozzle and various locking, mounting and retaining rings may be fabricated from a materal such as aluminum.

Figure 4:
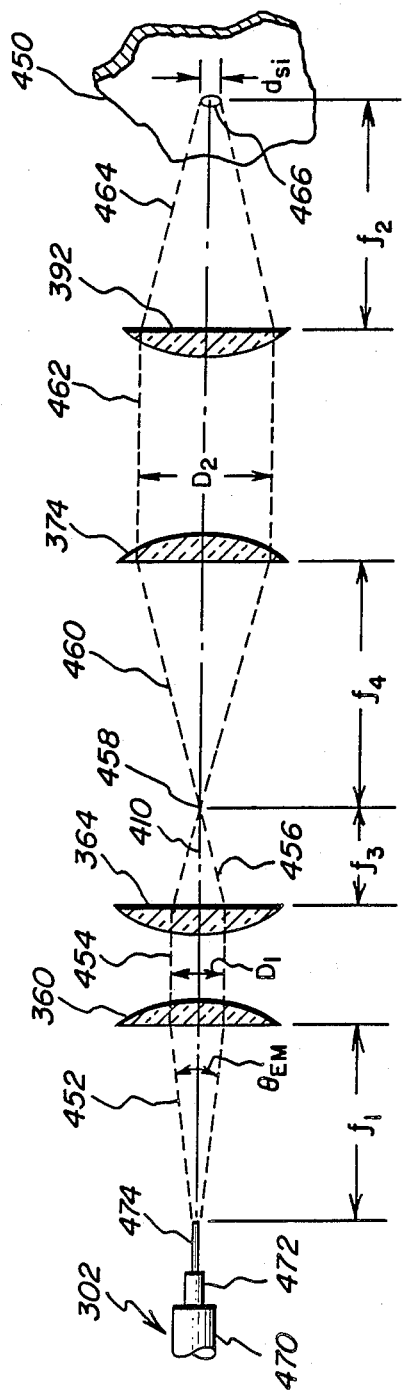
FIG. 4 schematically illustrates the lenses contained in the output coupler illustrated in FIGS. 3a and 3b in order to better show the relative positions of the lenses therein.

Referring now to FIG. 4, the relative positions of the respective lenses and fiber 302 illustrated in FIG. 3a are described in greater detail. For clarity, FIG. 4 only illustrates fiber 302, lenses 360, 364, 374 and 392 and an exemplary workpiece 450. In accordance with the preferred embodiment of the present invention, the power laser beam delivered through fiber 302 is emitted from the end thereof as a diverging beam portion 452 which diverges with an emitted cone angle $\theta_{EM}$. The emitted beam is collimated by collimating lens 360 into a collimated beam portion 454 having a diameter $D_1$. Lens 360 has a focal $f_1$ and is positioned the distance $f_1$ from the end of fiber 302. Collimated beam portion 454 is intercepted by expanding lens 364 which has a focal length $f_3$. The distance between lenses 360 and 364 is not critical. Lens 364 focuses the beam as a focussed portion 456 onto its focal point 458. The beam expands beyond the lens 364 focal point as an expanding beam portion 460. Collimating lens 374, having a focal length $f_4$, is positioned such that its focal point is substantially coincident with focal point 458 of lens 364. The focal length $f_4$ of lens 374 is selected so that the lens can be positioned to intercept expanding beam portion 460 at a predetermined desirable expanded diameter $D_2$. Lens 374 thereby serves to collimate the expanding beam portion into a collimated beam portion 462 having the diameter $D_2$. This collimated beam portion is intercepted by focussing lens 392, having a focal length $f_2$, which focuses the beam, as a focussed portion 464, onto workpiece 450 as a focussed spot 466. The focussed spot has a diameter designated $d_{si}$ to distinguish it from the spot diameter $d_s$ provided by the prior art coupler. The focal length designations for lenses 360 and 392 are selected to be the same as for the collimating and focussing lenses of the prior art output coupler, as is diameter designation $D_1$, to enable a comparison hereinbelow of that coupler with the coupler of the present invention. In general, the laser beam diameters referred to herein are defined as a diameter at which the beam intensity drops to $1/e^2$ of the peak beam intensity, where "e" is the base of the Napierian logarithmic system.

As described with respect to FIG. 3a, the lenses and fiber and hence the portions of the laser beam are all coaxial about axis 410. In consideration that the output coupler of the present invention is intended for use with a power laser beam, each lens is preferably fabricated of quartz to withstand, without brreaking, the heat generated by impingement thereon of the power laser beam. Further, to provide efficient beam transmission through the output coupler, each lens is preferably coated with a narrow wavelength-band anti-reflection coating selected to maximize transmissitivity of the wavelength of the power laser beam being employed. Such coatings are well known in the art and optical elements so coated are available from CVI Laser, Inc. of Albuquerque, N. Mex. Further in accordance with the practice of the present invention, the end of fiber 302 is prepared in a manner to assure that a uniformly conical beam is emitted therefrom and, further, that the emitted beam does not cause burning of the cladding or jacket of the fiber. The preferred manner of end preparation is described in the above incorporated patents directed to injecting a power laser beam into an optical fiber for transmission therethrough. While the fiber end preparation described therein serves to faciliate beam injection, it also serves to accomplish the above described characteristics of the emitted beam when that end preparation is practiced on the fiber output end. The appropriate end preparation, not shown in FIG. 3a, is diagrammatically illustrated in FIG. 4 wherein fiber 302 is shown to have a layered structure typical of a step-index type fiber, that type of fiber being preferred herein for power laser beam transmission. The successive portions 470, 472 and 474 of fiber 302 respectively correspond to the fiber with jacket, fiber without jacket but with cladding exposed and fiber with the bare core exposed without cladding. It is noted that other fiber types known in the art are suitable for power laser beam transmission and would have different layered structures. Such fibers would be subjected to end preparation in a manner analogous to that taught in the above incorporated patents.

The operation of the output coupler of the present invention and the manner in which it circumvents the above described limitations inherent in the prior art output coupler are described next. In particular, the inventive output coupler differs from the prior art output coupler by including additional lenses (lenses 364 and 374 in the preferred embodiment) for expanding the power laser beam to a larger diameter that is effective to enable a reduction in focussed spot diameter that cannot be achieved in the prior art coupler. Referring again to FIG. 4, it is assumed that the laser beam has a diameter $d_L$ (not shown) at focal point 458 of lens 364. The following expression is descriptive of the beam quality of the focussed beam portion of lens 364:

$$BQ_{FP} = d_L \times \frac{D_1}{f_3} \qquad (8)$$

where $BQ_{FP}$ is the beam quality of beam focussed portion 456. Similarly with respect to lens 374, the following expression is descriptive of a beam quality $BQ_{EP}$ of beam expanding portion 460:

$$BQ_{EP} = d_L \times \frac{D_2}{f_4}. \quad (9)$$

Since the respective beam qualities of beam portions 456 and 460 must be identical, the right hand sides of equations (8) and (9) can be equated and solved for $D_2$ to provide:

$$D_2 = \frac{f_4}{f_3} \times D_1. \quad (10)$$

Equation (5) which was presented hereinabove in describing prior art coupler 100 is equally applicable in expressing the beam quality $BQ_f$ of the beam emitted from fiber 302 in output coupler 300. The following expression is descriptive of the beam quality $BQ_{S2}$ of beam focussed portion 464:

$$BQ_{S2} = d_{si} \times \frac{D_2}{f_2}. \quad (11)$$

Since $BQ_f$ must equal $BQ_{S2}$, the respective right hand sides of equations (5) and (11) can be equated and solved for $d_{si}$ to provide:

$$d_{si} = d_f \times \frac{f_2}{f_1} \times \frac{D_1}{D_2}. \quad (12)$$

Substituting the result for $D_2$ obtained from equation (10) into equation (12) yields:

$$d_{si} = d_f \times \frac{f_2}{f_1} \times \frac{1}{f_4/f_3} \quad (13)$$

which is descriptive of the focussed spot diameter achievable by the inventive output coupler. The ratio $f_4/f_3$ is an expansion ratio by which the beam diameter is expanded from $D_1$ to $D_2$. As can be seen, by selecting lenses 364 and 374 such that the expansion ratio is greater than 1, the focussed spot diameter can readily be reduced. The focussed spot power density provided by prior art output coupler 100 can be expressed as:

$$PD_p = \frac{P}{(\pi d_s^2/4)} \quad (14)$$

where $PD_p$ is the power density provided by the prior art coupler and P is the total beam power available for focussing. By comparing equations (7) and (13) it is clear that the relationship between the respective focussed spot diameters provided by the prior art and inventive couplers can be expressed as:

$$d_s = d_{si} \times f_4/f_3 \quad (15)$$

Analogous to equation (14), the focussed spot power density provided by the output coupler of the present invention can be expressed as:

$$PD_i = \frac{P}{(\pi d_{si}^2/4)} \quad (16)$$

where $PD_i$ is the power density provided by the inventive coupler. Substituting into equation (16) the expression for $d_{si}$ derivable from equation (15) yields:

$$PD_i = \frac{P(f_4/f_3)^2}{(\pi d_s^2/4)}. \quad (17)$$

Using the definition for $PD_p$ from equation (14) enables equation (17) to be rewritten as:

$$PD_i = PD_p \times (f_4/f_3)^2 \quad (18)$$

Equation (18) illustrates that the focussed spot power density provided by the inventive coupler exceeds that of the prior art coupler by the expansion ratio squared and thus is seen to vary directly as the square of the expansion ratio. The substantial effect on the power density of expanding the beam is therefore clearly shown by equation (18). It is noted that if the expansion ratio is reduced to '1', the inventive coupler provides the same power density as the prior art output coupler.

Thus, the use of coupler 300 enables lens 360 to be selected to have a short focal length to assure that the entire fiber emitted beam is intercepted. Further, by selecting a suitably large expansion ratio, a longer focal length $f_2$ may be selected focussing lens 392 to assure a safe distance between the output coupler and workpiece. Additionally, the lens manufacturing restrictions described above do not present free selection of lenses 364 and 374 to achieve an expansion ratio that results in a desired spot size diameter that maximizes focussed spot power density. From an inspection of equation (16) it should be clear that a rapid increase in spot power density can be realized through small decreases in spot diameter. As is further apparent from equation (18), the rapid increase in spot power density is realized through the beam expansion as expressed by the expansion ratio. The coupler of the present invention is therefore not subject to the restrictions of the prior art output coupler and enables, through use of additional beam expanding optics, an increase in focussed spot power density that would otherwise be lost due to the above described adverse effects of optical fiber beam transmission.

In operation, with coupler 300 constructed as described above and illustrated in FIGS. 3 and 4, the laser beam transmitted through fiber 302 is emitted from the output end thereof as emitted beam portion 452. That emitted beam portion is collimated by collimating lens 360 to a collimated beam portion 454 having diameter $D_1$. That collimated beam portion is intercepted by expanding lens 364 which focusses the beam as focussed portion 456 onto its focal point 458 and the beam expands beyond that focal point as expanding beam portion 460. Lens 374 collimates the expanding beam portion into collimated beam portion 462 which has diameter $D_2$ that is greater than $D_1$. Collimated beam portion 462 is focussed by focussing lens 392 onto the workpiece as focussed portion 464 which focusses the beam as spot 466 having diameter $d_{si}$. The magnitude of $d_{si}$ can be minimized according to the amount of expansion the beam is subjected to.

An alternative way of viewing the desirable result achieved by expanding the laser beam within output coupler 300 is by way of the following alternate expression for focussed spot diameter $d_{si}$:

$$d_{si} = f_2 \times \theta_{D2} \quad (19)$$

where $\theta_{D2}$ is a divergence of beam collimated portion 462. As is well known in the art, a collimated beam which is expanded maintains its beam quality which the product of its diameter and divergence. Thus, expanding the beam within output coupler 300 serves to increase its diameter and decrease its divergence. As seen from equation (19), it is desirable to minimize the divergence of collimated portion 462 since this serves to decrease the focussed spot diameter. As a result, lenses 364 and 374 serve to expand collimated portion 454 with diameter $D_1$ into collimated portion 462 which has the larger diameter $D_2$ and smaller divergence, so that lens 392 can achieve a smaller focussed spot diameter corresponding to the smaller divergence of beam portion 462.

Coupler 300 as illustrated and described hereinabove comprises a plurality of elements. There is a preferred sequence for assembling those elements to construct coupler 300. Initially, with connector 314 and fiber holder 322 in place in mounting bracket 312, fiber 302 is introduced through the connector within which polyethylene tube 320 is terminated. The fiber is further passed through fiber holder 322 until the fiber output end projects the desired distance beyond the holder. The fiber holder cap bolts are then tightened to secure the fiber in place. Next, the end of barrel portion 306 is screwed onto the mounting bracket. Then locking ring 354 is screwed into a tentative location without barrel portion 306 and barrel portion 352, with lens 360 mounted therein, is screwed against that locking ring. The axial positioning of lens 360 is evaluated by measurement of diameter $D'hd 1$ of collimated beam portion 454 while transmitting through fiber 302 a low power laser beam (e.g. helium-neon) or a high power beam operated at low power. If necessary, barrel portion 352 is removed to enable adjustment of the position of locking ring 354. It is noted that with lens 360 installed, some adjustment of the end of fiber 302 is possible by removal of mounting bracket 312, adjustment of the fiber position within holder 322 and reinstallation of the bracket. After barrel portion 352 with lens 360 mounted therein is properly positioned, locking ring 356 and lens 364 are installed. Next, locking ring 372 and barrel portion 370, with lens 374 mounted therein, are screwed onto barrel portion 352. The axial position of barrel portion 370 and hence, lens 374 is screw adjusted until expanding beam portion 460 is intercepted to achieve the desired diameter $D_2$ of collimated beam portion 462, while a low power beam is being transmitted through fiber 302. Following this, barrel portion 390 is installed and lens 394 is mounted into the end thereof.

While details of the construction of output coupler 300 have been illustrated and described hereinabove, other constructions of output couplers effective to practice the present invention will now occur to those skilled in the art. For example, an output coupler constructed in accordance with the present invention need not have the cylindrical shape preferred herein. The fiber holding apparatus as well as the lenses may be mounted in any enclosure effective to provide the rigid support necessary to maintain alignment between the elements.

While output coupler 300 constructed in accordance with the preferred embodiment requires precise construction in order to provide the necessary alignment between the fiber and lenses, the invention is not so limited. The mounting bracket and fiber holder within which the fiber is supported may be dispensed with and replaced by a multi-axis fiber holder such as a holder #07 HFO 002 fiber holder manufactured by Mellis Groit of Irvine, Calif. That holder includes adjustment capabilities to enable adjustment of the supported fiber end along three mutually orthogonal directions as well as about two tilt axes. With the fiber so supported, final alignment of the fiber relative to the lenses can be adjusted to achieve proper output coupler operation.

While plano-convex lenses are illustrated and described with respect to the preferred embodiment, the invention is not so limited. Any lens type of combination of lenses may be used in place of each lens illustrated hereinabove so long as the replacement lens(es) performs the appropriate focussing, collimating or expanding function. For example, lens 364 may instead be provided as a plano-concave or double concave lens which would provide a diverging beam to be collimated by lens 374.

While FIGS. 3a and 4 illustrate the plano-convex lenses of the preferred embodiment as having approximately the same diameter as one another, the invention is not so limited. Lenses 374 and 392 may be provided with larger diameters than lenses 360 adn 364 in order to accommodate a desired diameter $D_2$ of the expanded beam.

While the output coupler of the present invention is described with respect to materials processing applications, the invention is not so limited. The output coupler can be used with equal effectiveness in other laser applications such as laser chemical vapor deposition and the various medical applications of lasers known in the art.

While a preferred embodiment has been illustrated and described herein, it will be obvious that numerous modifications, changes, variations, substitutions and equivalents, in whole or in part, will now occur to those skilled in the art without deparitng from the spirit and scope contemplated by the invention. Accordingly, it is intended that the invention herein be limited only by the scope of the appended claims.

What is claimed is:

1. Output coupling apparatus for a power laser beam transmitting optical fiber, comprising:
    first lens means for collimating as a first collimated beam portion the power laser beam emitted from an output end of the fiber;
    second lens means for expanding the first collimated beam portion into a second collimating beam portion having a larger diameter than the first collimated beam portion;
    third lens means for focussing, onto a surface, the second collimating beam portion as a focussed spot having a predetermined diameter;
    means for mounting said first, second and third lens means and the fiber output end in alignment so that the power laser beam emitted from the fiber output end is collimated by said first lens means, expanded by said second lens means and focussed to the focussed spot by said third lens means;
    said first lens means comprising a first plano-convex lens having a focal length $f_1$ and being mounted a distance $f_1$ from the fiber output end;
    said second lens means comprising a second and a third plano-convex lens, said second plano-convex lens being mounted to intercept the first collimating beam portion and provide an expanding beam portion beyond a focal point of said second plano-convex lens, said third plano-convex lens being mounted to intercept the expanding beam portion and provide the second collimated beam portion, said second and third plano-convex lenses having respective focal lengths $f_3$ and $f_4$ being spaced from one another by a distance that is the sum of $f_3$ and $f_4$; and said third lens means comprising a fourth plano-convex lens having a focal length $f_2$, the focussed spot being a distance $f_2$ from said fourth plano-convex lens.

2. The output cooling apparatus of claim 1 wherein the focussed spot diameter is designated $d_{si}$ and a core portion of the beam transmitting optical fiber has a diameter $d_f$; and the focused spot diameter being described by:

$$d_{si} = d_f \times \frac{f_2}{f_1} \times \frac{1}{f_4/f_3}.$$

3. The output coupling apparatus of claim 1 wherein said first, second, third and fourth plano-convex lenses and a portion of the beam transmitting optical fiber inclusive of its output end are all mounted coaxially with respect to one another.

4. The output coupling apparatus of claim 1 wherein each said first, second, third and fourth plano-convex lens is fabricated of fused quartz; and each said first, second, third and fourth planoconvex lens having a narrow wavelength band anti-reflection coating selected for efficient transmission of the wavelength of the power laser beam.

5. The output coupling apparatus of claim 1 wherein the first output end is rigidly supported in alignment with said first, second, third and fourth plano-convex lenses.

* * * * *